United States Patent
Freeman et al.

(10) Patent No.: US 10,830,074 B2
(45) Date of Patent: Nov. 10, 2020

(54) POTTED STATOR VANE WITH METAL FILLET

(71) Applicant: United Technologies Corporation, Farmington, CT (US)

(72) Inventors: Thomas Freeman, Kennebunk, ME (US); Brian Barainca, Kennebunk, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 162 days.

(21) Appl. No.: 16/026,638

(22) Filed: Jul. 3, 2018

(65) Prior Publication Data
US 2020/0011191 A1    Jan. 9, 2020

(51) Int. Cl.
*F01D 9/04* (2006.01)
*F01D 25/04* (2006.01)

(52) U.S. Cl.
CPC ............ *F01D 9/044* (2013.01); *F01D 25/04* (2013.01); *F05D 2220/3217* (2013.01); *F05D 2230/53* (2013.01); *F05D 2230/60* (2013.01); *F05D 2240/12* (2013.01); *F05D 2240/91* (2013.01); *F05D 2300/43* (2013.01); *Y10T 29/49323* (2015.01)

(58) Field of Classification Search
CPC . F01D 9/04; F01D 9/041; F01D 9/042; F01D 9/043; F01D 9/044; F01D 11/005
See application file for complete search history.

(56) References Cited

U.S. PATENT DOCUMENTS

| 2,771,622 | A | | 11/1956 | Thorp, II | |
| 3,802,797 | A | * | 4/1974 | Bintz | F01D 1/30 |
| | | | | | 415/153.2 |
| 4,155,680 | A | * | 5/1979 | Linko | F02C 6/08 |
| | | | | | 415/115 |

(Continued)

FOREIGN PATENT DOCUMENTS

| EP | 3064711 A1 | 9/2016 | |
| GB | 769148 A * | 2/1957 | ............. F01D 9/044 |

(Continued)

OTHER PUBLICATIONS

European Search Report for Application No. 19 18 4257; dated Dec. 6, 2019.

*Primary Examiner* — Michael Lebentritt
*Assistant Examiner* — Topaz L. Elliott
(74) *Attorney, Agent, or Firm* — Cantor Colburn LLP (57) ABSTRACT

A vane for use with a stator assembly is disclosed herein. The vane having: an upper mounting portion; a lower mounting portion; an airfoil body extending between the upper mounting portion and the lower mounting portion; a first integrally formed metal fillet located between the upper mounting portion and the airfoil body, the first integrally formed metal fillet defining a first mounting surface located between the upper mounting portion and first integrally formed metal fillet; and a second integrally formed metal fillet located between the lower mounting portion and the airfoil body, the second integrally formed metal fillet defining a second mounting surface located between the lower mounting portion and second integrally formed metal fillet.

9 Claims, 5 Drawing Sheets

(56) References Cited

U.S. PATENT DOCUMENTS

| | | | | |
|---|---|---|---|---|
| 4,509,238 A | * | 4/1985 | Lee | B23P 15/006 |
| | | | | 219/121.69 |
| 4,940,386 A | * | 7/1990 | Feuvrier | F01D 9/04 |
| | | | | 415/189 |
| 5,399,069 A | | 3/1995 | Marey et al. | |
| 5,494,404 A | * | 2/1996 | Furseth | F01D 9/042 |
| | | | | 415/209.3 |
| 5,547,342 A | * | 8/1996 | Furseth | F01D 9/042 |
| | | | | 415/200 |
| 5,569,019 A | * | 10/1996 | Katariya | F01D 9/042 |
| | | | | 415/200 |
| 5,586,864 A | * | 12/1996 | Knorowski | F01D 9/044 |
| | | | | 415/209.2 |
| 6,354,797 B1 | * | 3/2002 | Heyward | B23K 1/0018 |
| | | | | 415/191 |
| 7,311,495 B2 | * | 12/2007 | Ashley | F01D 5/26 |
| | | | | 415/209.4 |
| 8,535,013 B2 | * | 9/2013 | Care | F01D 11/008 |
| | | | | 416/212 A |
| 9,121,283 B2 | * | 9/2015 | Feigleson | F01D 25/285 |
| 9,169,736 B2 | * | 10/2015 | Hayford | F01D 9/044 |
| 9,303,531 B2 | * | 4/2016 | Hasting | F01D 9/042 |
| 9,434,031 B2 | * | 9/2016 | Feigleson | B23P 15/04 |
| 9,731,388 B2 | * | 8/2017 | Feigleson | B23P 15/04 |
| 9,816,387 B2 | * | 11/2017 | Carr | F01D 9/041 |
| 9,920,633 B2 | * | 3/2018 | Bergman | F01D 9/041 |
| 10,072,746 B2 | * | 9/2018 | Depraete | F16H 41/24 |
| 10,450,897 B2 | * | 10/2019 | Gallier | F01D 25/246 |
| 2009/0269203 A1 | * | 10/2009 | Care | F01D 11/008 |
| | | | | 416/221 |
| 2013/0014389 A1 | * | 1/2013 | Feigleson | F01D 25/285 |
| | | | | 29/889.22 |
| 2014/0013772 A1 | * | 1/2014 | Hayford | F01D 9/044 |
| | | | | 60/805 |
| 2014/0082940 A1 | * | 3/2014 | Feigleson | B23P 15/04 |
| | | | | 29/889.22 |
| 2014/0140832 A1 | * | 5/2014 | Hasting | F01D 9/042 |
| | | | | 415/190 |
| 2016/0024971 A1 | * | 1/2016 | Pearce | F01D 9/041 |
| | | | | 415/208.1 |
| 2016/0069201 A1 | * | 3/2016 | Carr | F01D 9/041 |
| | | | | 415/209.4 |
| 2016/0084094 A1 | * | 3/2016 | Feigleson | B23P 15/04 |
| | | | | 29/889.22 |
| 2016/0258296 A1 | * | 9/2016 | Bergman | F01D 9/041 |
| 2016/0327141 A1 | * | 11/2016 | Depraete | F16H 41/24 |
| 2016/0362984 A1 | * | 12/2016 | Brandl | B23P 15/04 |
| 2019/0063246 A1 | * | 2/2019 | Frey | C04B 37/001 |

FOREIGN PATENT DOCUMENTS

| | | |
|---|---|---|
| WO | 9517584 A1 | 6/1995 |
| WO | 2014150954 A1 | 9/2014 |

\* cited by examiner

POTTED STATOR VANE WITH METAL FILLET

BACKGROUND

Exemplary embodiments of the present disclosure pertain to stator vanes of a gas turbine engine and more particularly, a potted stator vane with an integral metal fillet.

Securement of a stator vane to an inner and outer shroud of vane assembly is necessary. These areas of securement are subjected to air and/or fluid flows and as such should provide an aerodynamic surface as well as providing a suitable method of securement.

Therefore, it is desirable to provide an improved method and apparatus for securement of a vane to its shrouds.

BRIEF DESCRIPTION

A vane for use with a stator assembly is disclosed herein. The vane having: an upper mounting portion; a lower mounting portion; an airfoil body extending between the upper mounting portion and the lower mounting portion; a first integrally formed metal fillet located between the upper mounting portion and the airfoil body, the first integrally formed metal fillet defining a first mounting surface located between the upper mounting portion and first integrally formed metal fillet; and a second integrally formed metal fillet located between the lower mounting portion and the airfoil body, the second integrally formed metal fillet defining a second mounting surface located between the lower mounting portion and second integrally formed metal fillet.

In addition to one or more of the features described above, or as an alternative to any of the foregoing embodiments, the first integrally formed metal fillet extends completely around a periphery of the airfoil and the second integrally formed metal fillet extends completely around a periphery of the airfoil.

In addition to one or more of the features described above, or as an alternative to any of the foregoing embodiments, the first mounting surface extends laterally away from the upper mounting portion and the second mounting surface extends laterally away from the lower mounting surface.

In addition to one or more of the features described above, or as an alternative to any of the foregoing embodiments, the first mounting surface further comprises a side surface that is congruent with the upper mounting portion and the second mounting surface further comprises a side surface that is congruent with the lower mounting surface.

In addition to one or more of the features described above, or as an alternative to any of the foregoing embodiments, the first mounting surface extends laterally away from the upper mounting portion and the second mounting surface extends laterally away from the lower mounting surface.

In addition to one or more of the features described above, or as an alternative to any of the foregoing embodiments, the first mounting surface further comprises a side surface that is congruent with the upper mounting portion and the second mounting surface further comprises a side surface that is congruent with the lower mounting surface.

In addition to one or more of the features described above, or as an alternative to any of the foregoing embodiments, the first mounting surface further comprises a side surface that is congruent with the upper mounting portion and the second mounting surface further comprises a side surface that is congruent with the lower mounting surface.

Also disclosed is a stator assembly for a compressor of a gas turbine engine, the stator assembly having: an upper shroud; a lower shroud; a plurality of vanes secured to the upper shroud and the lower shroud by a rubber potting, each of the plurality of vanes including: an upper mounting portion; a lower mounting portion; an airfoil body extending between the upper mounting portion and the lower mounting portion; a first integrally formed metal fillet located between the upper mounting portion and the airfoil body, the first integrally formed metal fillet defining a first mounting surface located between the upper mounting portion and first integrally formed metal fillet, wherein the rubber potting is located between the first mounting surface, the upper mounting portion and a surface of the upper shroud; and a second integrally formed metal fillet located between the lower mounting portion and the airfoil body, the second integrally formed metal fillet defining a second mounting surface located between the lower mounting portion and second integrally formed metal fillet, wherein the rubber potting is located between the second mounting surface, the lower mounting portion and a surface of the lower shroud.

In addition to one or more of the features described above, or as an alternative to any of the foregoing embodiments, the first integrally formed metal fillet extends completely around a periphery of the airfoil and the second integrally formed metal fillet extends completely around a periphery of the airfoil.

In addition to one or more of the features described above, or as an alternative to any of the foregoing embodiments, the first mounting surface extends laterally away from the upper mounting portion and the second mounting surface extends laterally away from the lower mounting surface.

In addition to one or more of the features described above, or as an alternative to any of the foregoing embodiments, the first mounting surface further comprises a side surface that is congruent with the upper mounting portion and the second mounting surface further comprises a side surface that is congruent with the lower mounting surface.

In addition to one or more of the features described above, or as an alternative to any of the foregoing embodiments, the first mounting surface extends laterally away from the upper mounting portion and the second mounting surface extends laterally away from the lower mounting surface.

In addition to one or more of the features described above, or as an alternative to any of the foregoing embodiments, the first mounting surface further comprises a side surface that is congruent with the upper mounting portion and the second mounting surface further comprises a side surface that is congruent with the lower mounting surface.

In addition to one or more of the features described above, or as an alternative to any of the foregoing embodiments, the first mounting surface further comprises a side surface that is congruent with the upper mounting portion and the second mounting surface further comprises a side surface that is congruent with the lower mounting surface.

In addition to one or more of the features described above, or as an alternative to any of the foregoing embodiments, the compressor is a low pressure compressor.

In addition to one or more of the features described above, or as an alternative to any of the foregoing embodiments, the stator assembly comprises a plurality of upper shrouds and a plurality of lower shrouds circumferentially aligned with each other.

In addition to one or more of the features described above, or as an alternative to any of the foregoing embodiments, the upper mounting portion, the first integrally formed metal fillet, the airfoil body, the lower mounting portion, the second integrally formed metal fillet are configured to pass through an opening in either the upper shroud or the lower shroud and the rubber potting secures the upper mounting portion and the first integrally formed metal fillet to the upper shroud and the rubber potting secures the lower mounting portion and the second integrally formed metal fillet to the lower shroud.

In addition to one or more of the features described above, or as an alternative to any of the foregoing embodiments, the first mounting surface extends laterally away from the upper mounting portion and the second mounting surface extends laterally away from the lower mounting surface.

In addition to one or more of the features described above, or as an alternative to any of the foregoing embodiments, the upper mounting portion, the first integrally formed metal fillet, the airfoil body, the lower mounting portion, the second integrally formed metal fillet are configured to pass through an opening in the upper shroud and the lower shroud and the rubber potting secures the upper mounting portion and the first integrally formed metal fillet to the upper shroud and the rubber potting secures the lower mounting portion and the second integrally formed metal fillet to the lower shroud.

Also, disclosed is a method of securing a plurality of vanes to a stator assembly of a gas turbine engine. The method including the steps of: inserting a plurality of vanes through a mounting opening on either an upper shroud or a lower shroud, each of the plurality of vanes comprising: an upper mounting portion; a lower mounting portion; an airfoil body extending between the upper mounting portion and the lower mounting portion; a first integrally formed metal fillet located between the upper mounting portion and the airfoil body, the first integrally formed metal fillet defining a first mounting surface located between the upper mounting portion and first integrally formed metal fillet, a second integrally formed metal fillet located between the lower mounting portion and the airfoil body, the second integrally formed metal fillet defining a second mounting surface located between the lower mounting portion and second integrally formed metal fillet; and bonding the upper mounting portion and the first integrally formed metal fillet to the upper shroud by inserting a rubber potting through an opening in the upper shroud; and bonding the lower mounting portion and the second integrally formed metal fillet to the lower shroud by inserting a rubber potting through an opening in the lower shroud.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
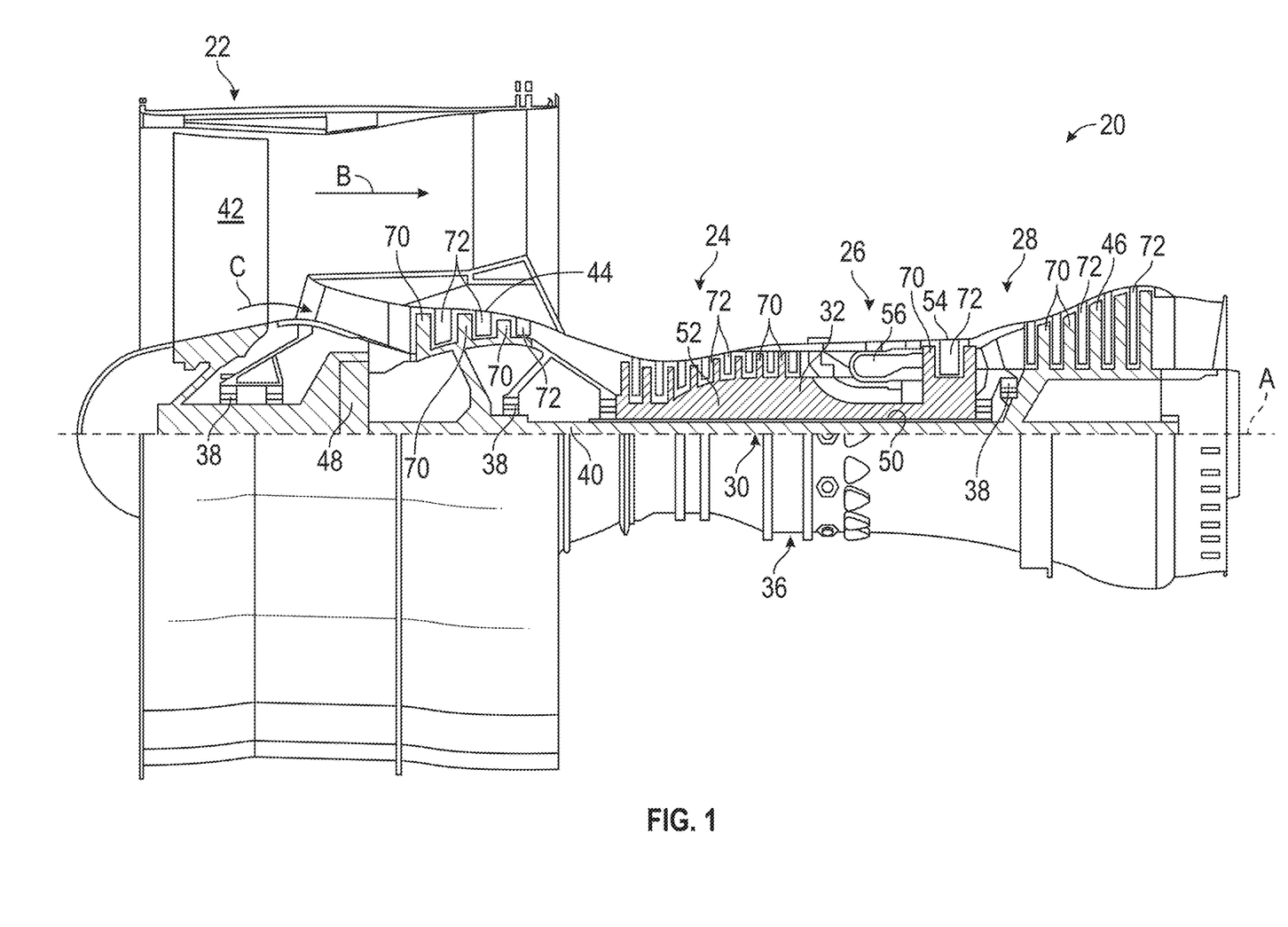
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis. A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The compressor sections 44 and 52 include rotating blade stages 70 and intermediate vane or stator assemblies 72. Both of these structures are shown schematically. It is known that the blades of the blade stages 70 typically rotate with a rotor. The vane or stator assemblies 72 are typically provided in the form of a ring, with vanes extending radially between an inner shroud and an outer shroud. In one embodiment, the ring may be formed from a plurality of stator segments that are circumferentially aligned with each other to form the vane or stator assembly 72. As illustrated, the turbine sections 44 and 46 also have blade stages 70 and vane or stator assemblies 72.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2A:
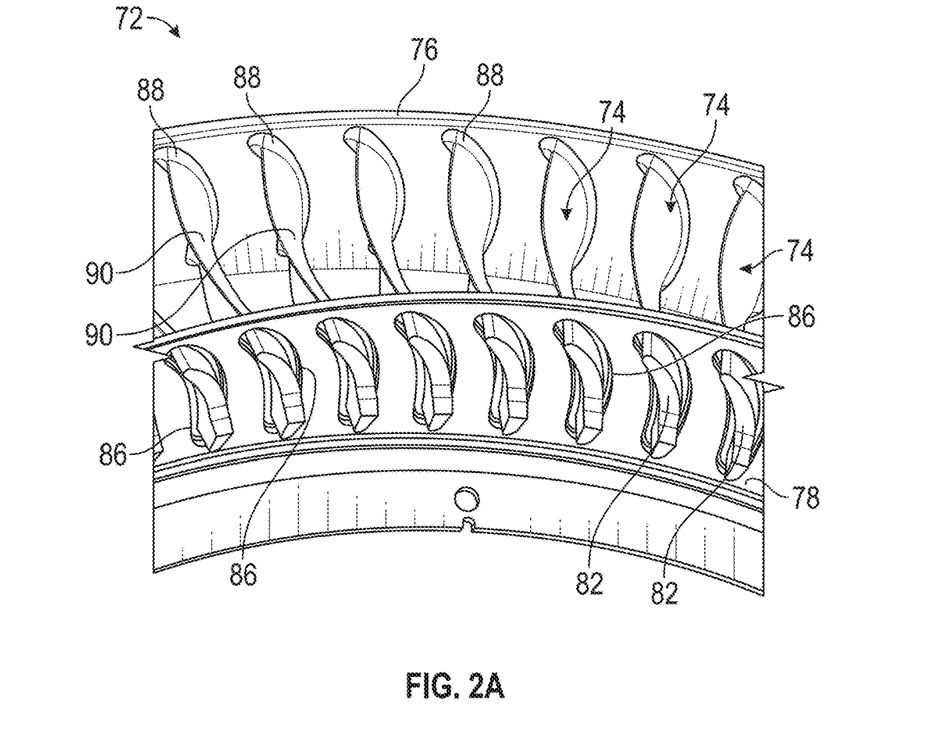
FIG. 2A is a partial perspective view of a stator assembly in accordance with an embodiment of present disclosure.
Figure 2B:
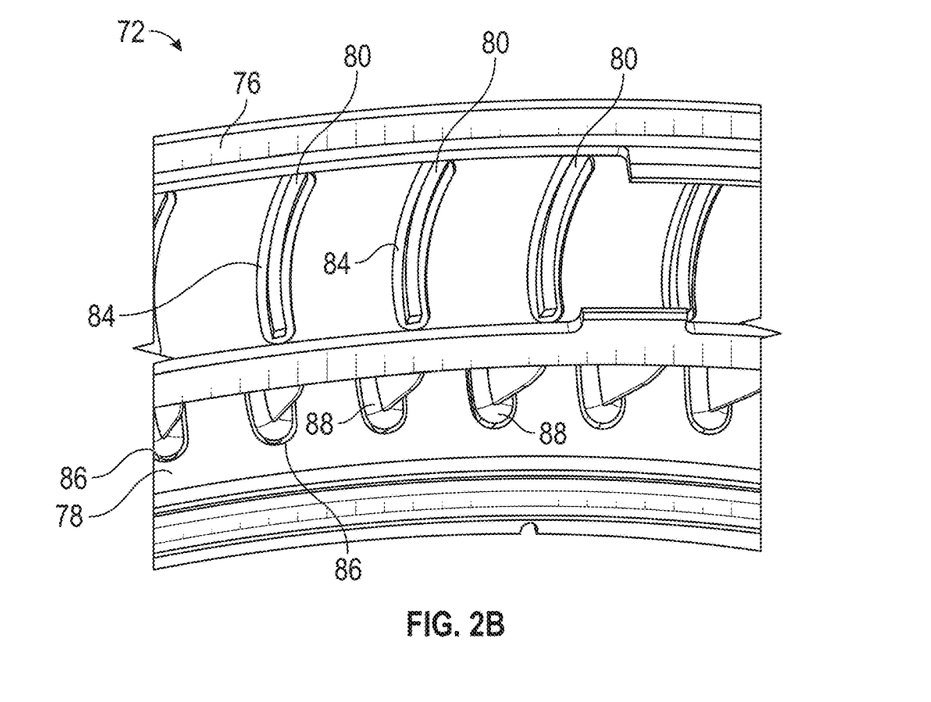
FIG. 2B is a partial perspective view of a stator assembly in accordance with an embodiment of present disclosure.

Referring now to FIGS. 2A and 2B partial perspective views of the vane or stator assemblies 72 are illustrated in accordance with one non-limiting embodiment. As illustrated a plurality of vanes 74 are located between an upper shroud 76 and a lower shroud 78 of the vane or stator assembly 72. As used herein the upper shroud 76 refers to a portion of the vane or stator assembly 72 that is further away from the axis A of the engine 20 than the lower shroud 78. Each of the vanes 74 has an upper mounting portion 80 and a lower mounting portion 82. The upper mounting portion 80 is received in a corresponding opening 84 of the upper shroud 76 while the lower mounting portion 82 is received in a corresponding opening 86 of the lower shroud 78. In accordance with various embodiments of the present disclosure, each of the vanes 74 has an integral fillet portion 88 located on opposite sides (e.g., pressure and suction sides) of an airfoil or airfoil portion 90 of the vane 74. As used herein integral fillet portion or integrally formed fillet portion refers to a fillet that is formed with the vane (e.g., precision forged, forged, cast, etc.) such that the fillet 88 cannot be removed from the vane 74 without a cutting process and/or the fillet is not separately secured to the vane.

Figure 3:
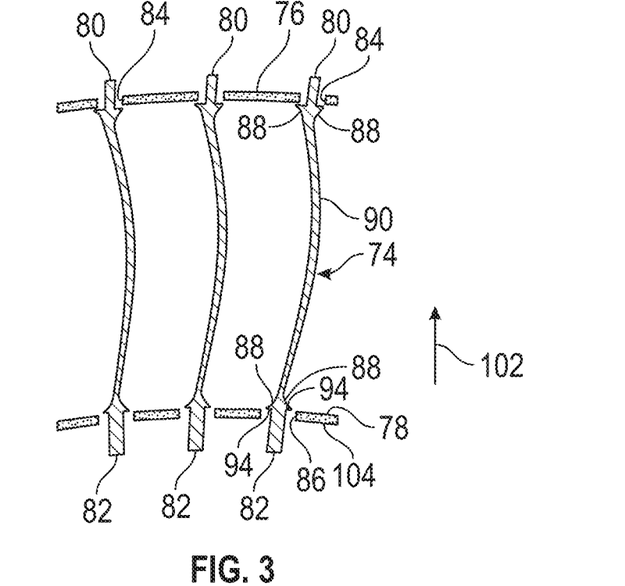
FIG. 3 is a partial cross-sectional view of a stator assembly in accordance with an embodiment of present disclosure.
Figure 4:
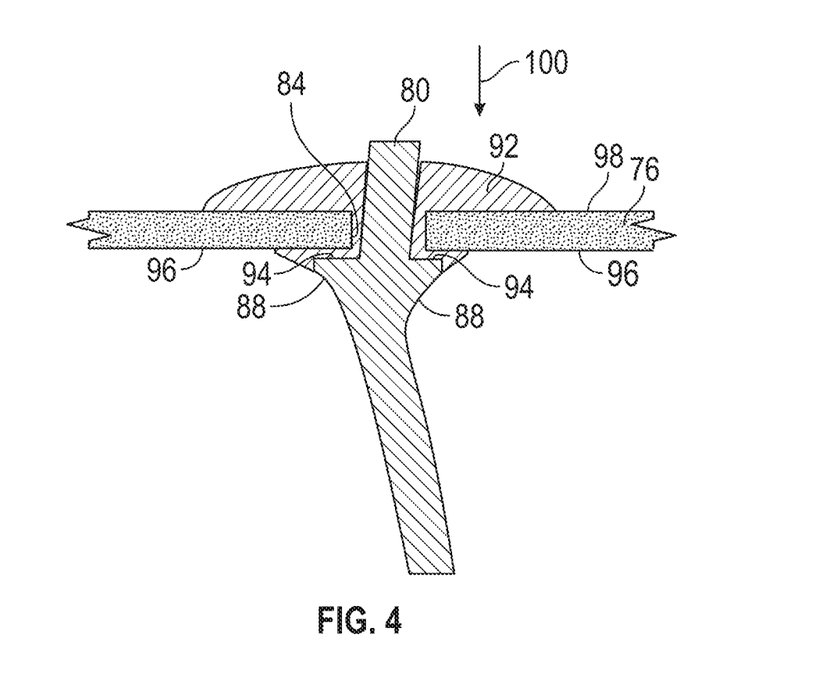
FIG. 4 is an enlarged partial cross-sectional view of a stator assembly in accordance with an embodiment of present disclosure.
Figure 5A:
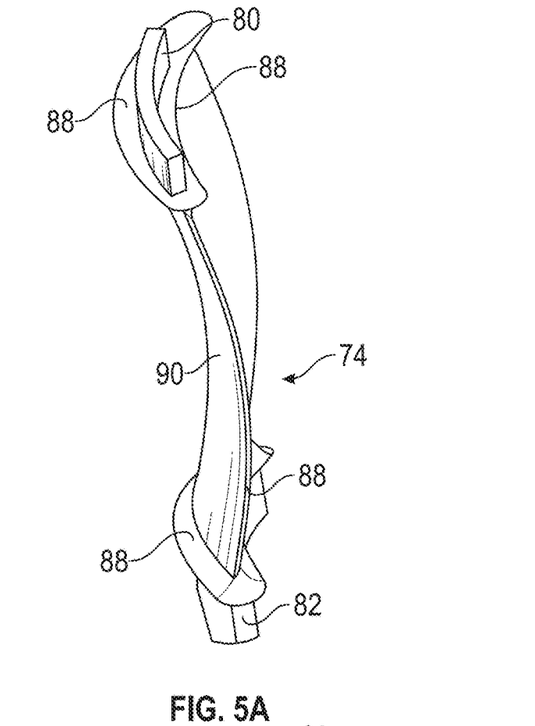
FIGS. 5A and 5B are perspective views of a vane for a stator assembly in accordance with an embodiment of present disclosure.
Figure 5B:
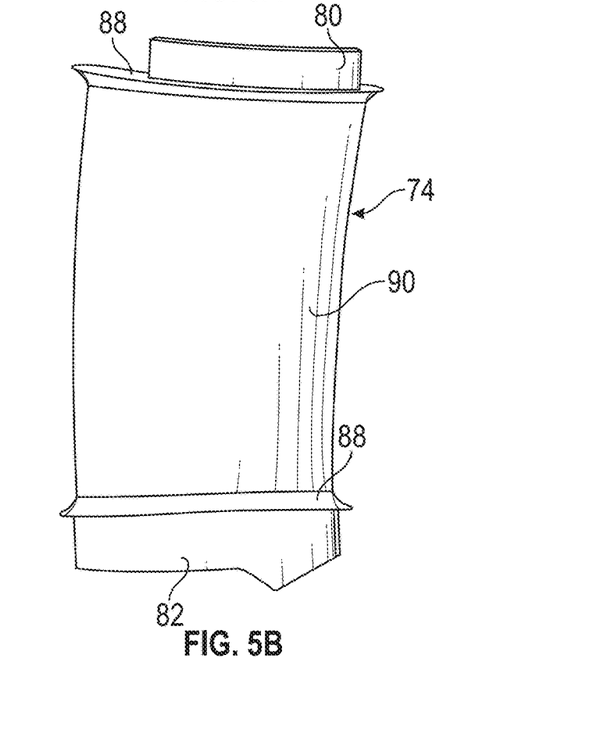

In one embodiment and as illustrated in at least FIGS. 3 and 4, the integral fillet portions 88 of the vane 74 are located between the airfoil portion 90 and the mounting portions 80, 82 of the vane 74. Still further and in one embodiment, the integral fillet portions 88 extend completely around a periphery of the airfoil 90 of the vane 74.

In one embodiment, the vane or stator assembly is a double potted stator wherein rubber potting 92 is used to bond the vanes 74 to the upper or outer shroud 76 and the inner or lower shroud 78. If the rubber potting is applied without integral fillet portions 88, a great amount of time and skill is required to form streamlined vane fillets within the flow path as the rubber potting will have to be formed into the shape of the fillet. The resulting rubber fillets vary in size and form, which reduces aero efficiency. Also, such a finished rubber joint is also mostly loaded in compression and tension, which is in contrast to the stronger shear aspects of the rubber joint.

For example and referring at least to FIG. 4, the fillet 88 extends from a ledge 94 that is spaced from a surface 96 of the upper shroud 76. In addition, the upper mounting portion 80 is spaced from the sides of opening 84. As such, the rubber potting material 92 can be applied to a surface 98 of the upper shroud 76 in the direction of arrow 100. In one non-limiting embodiment, the potting material 92 is a rubber, elastomer or silicone rubber that has elastic properties while providing adhesive and hardness qualities suitable for use in a compressor stator (low or high) as well as dampening characteristics to minimize vane vibration and stress. Surface 98 is opposite to surface 96 and due to the space between the upper mounting portion 80 and the opening 84 the rubber potting material 92 passes therethrough and is stopped by ledge 94. In one embodiment and as illustrated in at least FIGS. 2A-5B, the ledge 94 extends laterally away from the respective mounting portion. Accordingly, the ledge 94 provides a back stop feature for the application of the rubber potting material as it is applied in the direction of arrow 100. By incorporating an integral metal fillet 88 into the airfoil 90 of vane 74, less rubber is loaded in tension and compression and the ledge 94 provides an additional bonding surface that allows for shear loading of the rubber potting material 92. As illustrated, only a small portion of the rubber potting material 92 extends from the fillet 88 to the surface 96 of the upper shroud 76.

As illustrated in at least FIG. 3, the fillet 88 proximate to the lower mounting portion 82 is received in opening 86 and is mounted to the lower shroud 78 in a similar fashion. However, the opening 86 is larger than the width of the fillet 88 as this allows for the vane 74 to be inserted in the direction of arrow 102 such that the upper mounting portion 80 and its associated fillet 88 pass through opening 86 until they are located proximate to the upper shroud 76 and its opening 84. Once this occurs, the fillet 88 proximate to the lower mounting portion 82 is located in the position illustrated in at least FIG. 3. Thereafter, rubber potting material is inserted into opening 86 from a back side 104 of the lower shroud 78 in the direction of arrow 102. Similar to the upper fillet 88, the rubber potting material 92 will pass between the lower mounting portion 82 and the sides of opening 86 until it contacts a ledge 94 of the fillet 88. Although, the vane 74 is illustrated as being inserted into the assembly by first passing through the inner shroud 78 various embodiments contemplate that the vane 74 can be first inserted through the upper shroud 76 that is by making opening 84 bigger and opening 86 is made smaller such that the fillet 88 proximate to the lower mounting portion 82 cannot pass therethrough. In being understood that the smaller opening either 84 or 86 prevents the ledge 94 of the fillet from passing therethrough while the larger opening either 84 or 86 allows the vane 74 to be completely inserted therethrough.

Figure 6:
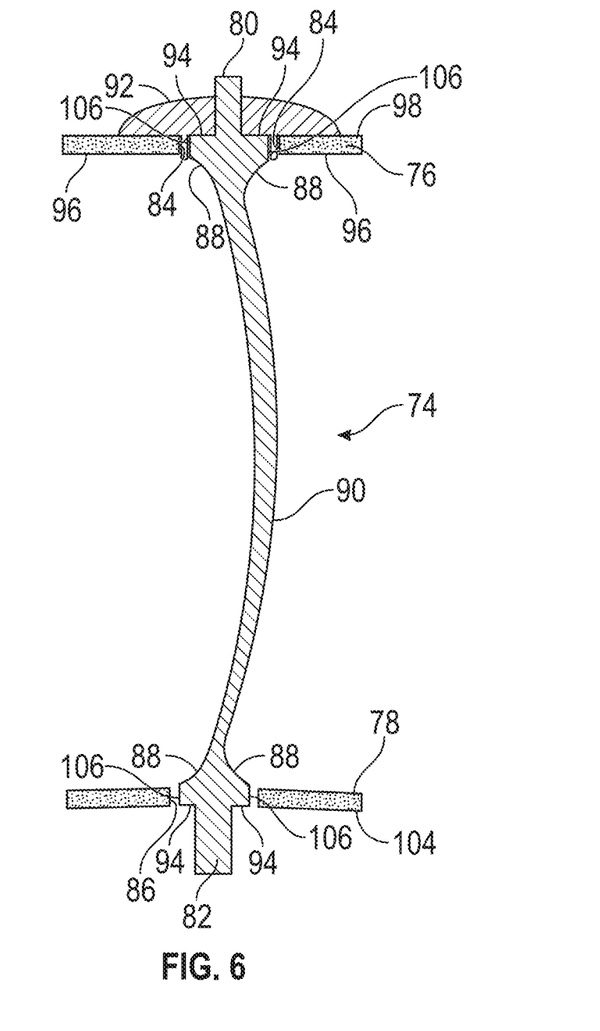
FIG. 6 is a partial cross-sectional view of a stator assembly in accordance with another embodiment of the present disclosure.

In an alternative embodiment and as illustrated in FIG. 6, the vane 74 and openings 84 and 86 are configured such that the fillet 88 terminates at the interface of the fillet 88 to the surfaces of the shrouds 76 and 78 such that the rubber potting material 92 is primarily disposed between the periphery of openings 84 and 86 and a side surface 106 that extends between fillet 88 and ledge 94. In this embodiment, the mounting surface is provided by ledge 94 and side surface 106. Here, ledge 94 extends laterally away from the respective mounting portion while the side surface 106 is parallel or congruent with the mounting portion.

Accordingly, a double potted stator or vane assembly is created by using vanes 74 with integral vane fillets 88 instead of having to form the vane fillets 88 with rubber potting material 92. The integral vane fillets 88 are designed in a way to increase the rubber adhesive bond area, optimize the rubber loading, and minimize the amount of exposed rubber to the gas path.

Creating integral metal fillets 88 in the vanes 74 will reduce the amount of time and skill needed to assemble the double potted stator. The metal fillets 88 will be more consistent in size and form from vane 74 to vane 74, which improves aero efficiency. The rubber joint will have increased rubber adhesive bond area and shear area resulting in a more durable rubber joint. The vanes 74 with integral fillets 88 will be able to be precision forged more easily than a full platformed vane. In addition, the rubber thickness between vanes 74 is even and thinner all around vane slot, evenly distributing the rubber stress.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane for use with a stator assembly, the vane comprising:
    an upper mounting portion;
    a lower mounting portion;
    an airfoil body extending between the upper mounting portion and the lower mounting portion;
    a first integrally formed metal fillet located between the upper mounting portion and the airfoil body, the first integrally formed metal fillet defining a first mounting surface located between the upper mounting portion and the first integrally formed metal fillet, the first mounting surface extending laterally away from the upper mounting portion; and
    a second integrally formed metal fillet located between the lower mounting portion and the airfoil body, the second integrally formed metal fillet defining a second mounting surface located between the lower mounting portion and the second integrally formed metal fillet, the second mounting surface extending laterally away from the lower mounting portion, wherein the first integrally formed metal fillet extends completely around a periphery of the airfoil body and the second integrally formed metal fillet extends completely around another periphery of the airfoil body, wherein a side surface extends from the first mounting surface to the first integrally formed metal fillet and a side surface extends from the second mounting surface to the second integrally formed metal fillet.

2. A stator assembly for a compressor of a gas turbine engine, comprising:
    an upper shroud;
    a lower shroud;
    a plurality of vanes secured to the upper shroud and the lower shroud by a rubber potting, each of the plurality of vanes comprising:
    an upper mounting portion;
    a lower mounting portion;
    an airfoil body extending between the upper mounting portion and the lower mounting portion;
    a first integrally formed metal fillet located between the upper mounting portion and the airfoil body, the first integrally formed metal fillet defining a first mounting surface located between the upper mounting portion and the first integrally formed metal fillet, the first mounting surface extending laterally from the upper mounting portion, wherein the rubber potting is located between the first mounting surface, the upper mounting portion and a surface of the upper shroud, the surface of the upper shroud being in a facing spaced relationship with respect to the first mounting surface; and
    a second integrally formed metal fillet located between the lower mounting portion and the airfoil body, the second integrally formed metal fillet defining a second mounting surface located between the lower mounting portion and the second integrally formed metal fillet, the second mounting surface extending laterally from the lower mounting portion, wherein the rubber potting is located between the second mounting surface, the lower mounting portion and a surface of the lower shroud, the surface of the lower shroud being in a facing spaced relationship with respect to the second mounting surface.

3. The stator assembly of claim 2, wherein the first integrally formed metal fillet extends completely around a periphery of the airfoil and the second integrally formed metal fillet extends completely around another periphery of the airfoil.

4. The stator assembly of claim 2, wherein the compressor is a low pressure compressor.

5. The stator assembly of claim 2, wherein the stator assembly comprises a plurality of upper shrouds and a plurality of lower shrouds circumferentially aligned with each other.

6. The stator assembly of claim 2, wherein the upper mounting portion, the first integrally formed metal fillet, the airfoil body, the lower mounting portion, the second integrally formed metal fillet are configured to pass through an opening in either the upper shroud or the lower shroud and the rubber potting secures the upper mounting portion and the first integrally formed metal fillet to the upper shroud and the rubber potting secures the lower mounting portion and the second integrally formed metal fillet to the lower shroud.

7. A stator assembly for a compressor of a gas turbine engine, comprising:
   an upper shroud;
   a lower shroud;
   a plurality of vanes secured to the upper shroud and the lower shroud by a rubber potting, each of the plurality of vanes comprising:
      an upper mounting portion;
      a lower mounting portion;
      an airfoil body extending between the upper mounting portion and the lower mounting portion;
      a first integrally formed metal fillet located between the upper mounting portion and the airfoil body, the first integrally formed metal fillet defining a first mounting surface located between the upper mounting portion and the first integrally formed metal fillet, wherein the rubber potting is located between the first mounting surface, the upper mounting portion and a surface of the upper shroud; and
      a second integrally formed metal fillet located between the lower mounting portion and the airfoil body, the second integrally formed metal fillet defining a second mounting surface located between the lower mounting portion and the second integrally formed metal fillet, wherein the rubber potting is located between the second mounting surface, the lower mounting portion and a surface of the lower shroud, wherein a side surface extends from the first mounting surface to the first integrally formed metal fillet and a side surface extends from the second mounting surface to the second integrally formed metal fillet.

8. The stator assembly of claim 7, wherein the upper mounting portion, the first integrally formed metal fillet, the side surface extending from the first integrally formed metal fillet, the airfoil body, the lower mounting portion, the second integrally formed metal fillet, and the side surface extending from the second integrally formed metal fillet, are configured to pass through an opening in the upper shroud and an opening in the lower shroud and the rubber potting secures the upper mounting portion and the first integrally formed metal fillet to the upper shroud and the rubber potting secures the lower mounting portion and the second integrally formed metal fillet to the lower shroud.

9. A method of securing a plurality of vanes to a stator assembly of a gas turbine engine, the method comprising:
   inserting a plurality of vanes through a mounting opening on either an upper shroud or a lower shroud, each of the plurality of vanes comprising: an upper mounting portion; a lower mounting portion; an airfoil body extending between the upper mounting portion and the lower mounting portion; a first integrally formed metal fillet located between the upper mounting portion and the airfoil body, the first integrally formed metal fillet defining a first mounting surface located between the upper mounting portion and the first integrally formed metal fillet, the first mounting surface extending laterally away from the upper mounting portion, a second integrally formed metal fillet located between the lower mounting portion and the airfoil body, the second integrally formed metal fillet defining a second mounting surface located between the lower mounting portion and the second integrally formed metal fillet, the second mounting surface extending laterally away from the lower mounting portion; and
   bonding the upper mounting portion and the first integrally formed metal fillet to the upper shroud by inserting a rubber potting through an opening in the upper shroud, wherein the rubber potting is located between the first mounting surface, the upper mounting portion and a surface of the upper shroud, the surface of the upper shroud being in a facing spaced relationship with respect to the first mounting surface; and
   bonding the lower mounting portion and the second integrally formed metal fillet to the lower shroud by inserting a rubber potting through an opening in the lower shroud, wherein the rubber potting is located between the second mounting surface, the lower mounting portion and a surface of the lower shroud, the surface of the lower shroud being in a facing spaced relationship with respect to the second mounting surface.

* * * * *